(12) United States Patent
Lu

(10) Patent No.: US 12,225,373 B2
(45) Date of Patent: Feb. 11, 2025

(54) PRIVACY INFORMATION TRANSMISSION METHOD, APPARATUS, COMPUTER DEVICE AND COMPUTER-READABLE MEDIUM

(71) Applicant: ZTE CORPORATION, Shenzhen (CN)

(72) Inventor: Haitao Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 324 days.

(21) Appl. No.: 17/784,808

(22) PCT Filed: Sep. 27, 2020

(86) PCT No.: PCT/CN2020/118111
§ 371 (c)(1),
(2) Date: Jun. 13, 2022

(87) PCT Pub. No.: WO2021/129012
PCT Pub. Date: Jul. 1, 2021

(65) Prior Publication Data
US 2023/0023665 A1    Jan. 26, 2023

(30) Foreign Application Priority Data
Dec. 25, 2019 (CN) .......................... 201911358121.2

(51) Int. Cl.
*H04W 12/02* (2009.01)
*H04L 9/14* (2006.01)
(Continued)

(52) U.S. Cl.
CPC .............. *H04W 12/02* (2013.01); *H04L 9/14* (2013.01); *H04L 9/3297* (2013.01); *H04W 12/033* (2021.01)

(58) Field of Classification Search
None
See application file for complete search history.

(56) References Cited

U.S. PATENT DOCUMENTS 5,864,665 A * 1/1999 Tran ...................... G06F 21/33
713/182
11,122,428 B2 * 9/2021 Wang ...................... H04L 9/08
(Continued)

FOREIGN PATENT DOCUMENTS

| CN | 1790984 A | 6/2006 |
|---|---|---|
| CN | 101442407 B | 5/2011 |

(Continued)

OTHER PUBLICATIONS

International Searching Authority. International Search Report and Written Opinion for PCT Application No. PCT/CN2020/118111 and English translation, mailed Jan. 7, 2021, pp. 1-10.
(Continued)

*Primary Examiner* — Michael W Chao
(74) *Attorney, Agent, or Firm* — Vivacqua Crane, PLLC

(57) ABSTRACT

A privacy information transmission method, an apparatus, a computer device and a computer-readable medium are disclosed. The method may include: generating authentication information in response to receiving of an identity registration request message sent by a terminal device via a base station, and encrypting the authentication information with a first private key to generate encrypted authentication information; sending a first identity identification request message carrying the encrypted authentication information to the terminal device; and receiving an identity identification response message returned by the terminal device, and acquiring privacy information from the identity identification response message.

4 Claims, 7 Drawing Sheets

(51) Int. Cl.
*H04L 9/32* (2006.01)
*H04W 12/033* (2021.01)

(56) References Cited

U.S. PATENT DOCUMENTS

| | | | | |
|---|---|---|---|---|
| 2003/0172278 | A1* | 9/2003 | Farnham | H04L 63/0435 |
| | | | | 713/176 |
| 2004/0078571 | A1* | 4/2004 | Haverinen | H04L 9/3213 |
| | | | | 713/168 |
| 2004/0203600 | A1* | 10/2004 | McCorkle | H04L 63/162 |
| | | | | 455/411 |
| 2005/0232426 | A1* | 10/2005 | Konersmann | H04L 63/061 |
| | | | | 380/277 |
| 2008/0002829 | A1* | 1/2008 | Forsberg | H04L 63/0428 |
| | | | | 380/247 |
| 2008/0134311 | A1* | 6/2008 | Medvinsky | H04L 9/3263 |
| | | | | 726/12 |
| 2008/0298587 | A1* | 12/2008 | Luk | H04L 9/12 |
| | | | | 380/255 |
| 2009/0204808 | A1* | 8/2009 | Guo | H04L 9/3213 |
| | | | | 713/162 |
| 2009/0220091 | A1* | 9/2009 | Howard | H04L 9/083 |
| | | | | 726/3 |
| 2009/0305671 | A1* | 12/2009 | Luft | H04W 36/04 |
| | | | | 455/411 |
| 2011/0078438 | A1* | 3/2011 | Tie | H04L 63/0869 |
| | | | | 713/169 |
| 2011/0164749 | A1* | 7/2011 | Natarajan | H04L 9/0869 |
| | | | | 380/270 |
| 2011/0291803 | A1* | 12/2011 | Bajic | G08B 13/2462 |
| | | | | 340/10.1 |
| 2013/0103939 | A1* | 4/2013 | Radpour | H04W 12/50 |
| | | | | 713/152 |
| 2015/0163056 | A1* | 6/2015 | Nix | H04W 12/03 |
| 2015/0358820 | A1 | 12/2015 | Li et al. | |
| 2016/0255492 | A1* | 9/2016 | Kilgour | H04W 8/26 |
| | | | | 455/435.1 |
| 2016/0315772 | A1* | 10/2016 | McCallum | H04L 9/3033 |
| 2017/0295489 | A1* | 10/2017 | Agiwal | H04W 12/0433 |
| 2018/0020351 | A1* | 1/2018 | Lee | H04L 9/0822 |
| 2018/0367303 | A1 | 12/2018 | Velev et al. | |
| 2019/0007376 | A1* | 1/2019 | Norrman | H04L 63/0876 |
| 2020/0068391 | A1* | 2/2020 | Liu | H04W 12/06 |
| 2020/0169877 | A1* | 5/2020 | Kim | H04W 12/06 |
| 2020/0186995 | A1* | 6/2020 | Nakarmi | H04W 12/03 |
| 2020/0344605 | A1* | 10/2020 | Lee | H04W 12/106 |
| 2022/0240213 | A1* | 7/2022 | Ly | H04W 48/18 |
| 2022/0263819 | A1* | 8/2022 | Kim | H04W 12/06 |

FOREIGN PATENT DOCUMENTS

| | | |
|---|---|---|
| CN | 101141251 B | 5/2012 |
| CN | 102882685 A | 1/2013 |
| CN | 105101183 A | 11/2015 |
| CN | 105636037 A | 6/2016 |
| CN | 108718323 A | 10/2018 |
| CN | 110062383 A | 7/2019 |
| CN | 110521228 A | 11/2019 |
| CN | 100589381 C | 2/2020 |

OTHER PUBLICATIONS

The State Intellectual Property Office of People's Republic of China. First Office Action for CN Application No. 201911358121.2 and English translation, mailed Jul. 23, 2024, pp. 1-7.

The State Intellectual Property Office of People's Republic of China. First Search Report for CN Application No. 201911358121.2 and English translation, mailed Jul. 20, 2024, pp. 1-6.

* cited by examiner

PRIVACY INFORMATION TRANSMISSION METHOD, APPARATUS, COMPUTER DEVICE AND COMPUTER-READABLE MEDIUM

CROSS-REFERENCE TO RELATED APPLICATION

This application is a national stage filing under 35 U.S.C. § 371 of international application number PCT/CN2020/118111, filed Sep. 27, 2020, which claims priority to Chinese patent application No. 201911358121.2, filed Dec. 25, 2019. The contents of these applications are incorporated herein by reference in their entirety.

TECHNICAL FIELD

The present disclosure relates to the technical field of communications, and in particular, to a privacy information transmission method, an apparatus, a computer device, and a non-transitory computer-readable medium.

BACKGROUND

Nowadays, the society pays more and more attention to the protection of personal privacy information. During mobile communication, a large number of terminal devices are utilized, and each terminal device has a globally unique International Mobile Subscriber Identity (IMSI). The IMSI consists of a string of decimal numbers with a maximum length of 15 digits, and is an identification code that distinguishes a user from another in mobile networks and is unique in global mobile networks. Therefore, the IMSI is privacy information of a user, and how to prevent leakage of the IMSI is a focused issue to protect the user's privacy in the mobile communication.

The standard protocol 3GPP R15 of 5G mobile communication (5-Generation, the 5th generation mobile communication) has taken into account the protection of users' IMSIs. In the design of 3rd Generation Partnership Project (3GPP), the interaction between a terminal device and a network is through Non-Access Stratum (NAS) signaling. Security measures are fully considered in the NAS protocol to protect IMSIs by encryption during communication. In addition to the encryption and security for signaling, instead of the IMSI, a Temporary Mobile Subscriber Identity (TMSI) is utilized to prevent leakage of user information caused by exposure of the IMSI. However, when a terminal device accesses a network for the first time or is restarted after a long time of shutdown, the network will require the identification of the identity of the terminal device, which will inevitably carry privacy information, leading to a risk of leakage of the privacy information in some signaling process.

SUMMARY

In view of the above, the present disclosure provides a privacy information transmission method, an apparatus, a computer device, and a non-transitory computer-readable medium.

According to an embodiment of the present disclosure, a privacy information transmission method is provided, which may include: generating authentication information in response to receiving of an identity registration request message sent by a terminal device via a base station, and encrypting the authentication information with a first private key to generate encrypted authentication information; sending a first identity identification request message carrying the encrypted authentication information to the terminal device; and receiving an identity identification response message returned by the terminal device, and acquiring privacy information from the identity identification response message.

According to an embodiment of the present disclosure, a privacy information transmission method is provided, which may includes: sending an identity registration request message; receiving a first identity identification request message sent by a network device, and acquiring encrypted authentication information from the first identity identification request message; decrypting the encrypted authentication information with a first public key to generate authentication information; and sending an identity identification response message carrying privacy information to the network device in response to the authentication information being determined as valid.

According to an embodiment of the present disclosure, a terminal device is provided, which may include: a generation module, configured to generate authentication information in response to receiving an identity registration request message sent by a terminal device via a base station; an encryption module, configured to encrypt the authentication information with a first private key to generate encrypted authentication information; a sending module, configured to send a first identity identification request message carrying the encrypted authentication information to the terminal device; and an acquisition module, configured to receive an identity identification response message returned by the terminal device, and acquire privacy information from the identity identification response message.

According to an embodiment of the present disclosure, a terminal device is provided, which may include: a receiving module, configured to receive a first identity identification request message sent by a network device; an acquisition module, configured to acquire encrypted authentication information from the first identity identification request message; a decryption module, configured to decrypt the encrypted authentication information with a first public key to generate authentication information; and a sending module, configured to send an identity registration request message, and send an identity identification response message carrying privacy information to the network device in response to the authentication information being determined as valid.

According to an embodiment of the present disclosure, a computer device is provided, which may include: at least one processor; and a storage apparatus, storing at least one program which, when executed by the processor, causes the processor to implement the privacy information transmission method as described above.

According to an embodiment of the present disclosure, provided is a non-transitory computer-readable medium storing a computer program which, when executed by a processor, causes the processor to implement the privacy information transmission method as described above.

DETAILED DESCRIPTION

Figure 1:
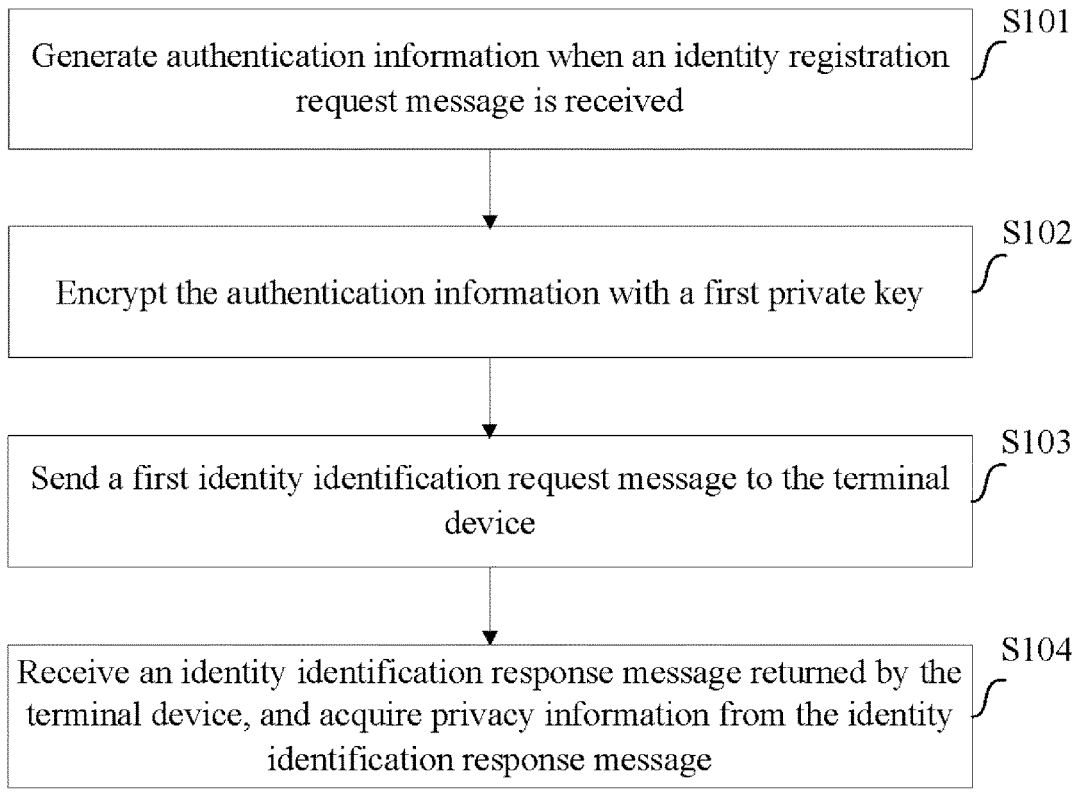
FIG. 1 depicts a flowchart of a privacy information transmission method according to an embodiment of the present disclosure.

Some embodiments of the present disclosure will be described with more detail below in conjunction with the accompanying drawings. However, the embodiments may be embodied in different forms and should not be construed as being limitative to the embodiments described herein. Rather, the embodiments are provided so as to enable those having ordinary skill in the art to understand the scope of the present disclosure.

The term "and/or", if used herein includes any and all combinations of one or more related items as referred to.

The terms used herein are for the purpose of describing specific embodiments only, and are not intended to limit the present disclosure. As used herein, the singular forms "a" and "the" may also include plural forms, unless otherwise clearly indicated in the context. It is to be further understood that the terms "include/comprise" and/or "made of . . . " used in the description specify the presence of the features, integers, steps, operations, elements and/or components, but may not exclude the presence or addition of one or more of other features, integers, steps, operations, elements, components and/or their combinations.

The embodiments described herein may be described referring to plan views and/or cross-sectional views by way of ideal schematic diagrams of the present disclosure. Accordingly, diagrams in the examples may be modified depending on manufacturing technologies and/or tolerances. Therefore, embodiments are not limited to those shown in the accompanying drawings, but include modifications in configuration formed on the basis of manufacturing processes. Therefore, regions illustrated in the accompanying drawings are schematic, and shapes of regions shown in the figures illustrate specific shapes of regions of elements, which are not intended to be restrictive.

Unless otherwise defined, all terms (including technical and scientific terms) used herein have the same meaning as commonly understood by those having ordinary skill in the art. It is to be further understood that terms, such as those defined in dictionaries, should be interpreted as having meanings that are consistent with their meanings in the context in the art and the present disclosure and shall not be interpreted in an idealized or overly formal sense unless expressly so defined herein.

When a terminal device accesses a network for the first time or is restarted after a long time of shutdown, an attacker may actively capture privacy information (such as an IMSI) of the initial NAS signaling. "Actively" means that the attacker is disguised as a communication base station and sends an identity verification request message to the terminal device, and the terminal device may leak the privacy information in response to the request. A privacy information transmission method is provided according to an embodiment of the present disclosure, to prevent privacy information interception described above.

The privacy information transmission method according to an embodiment of the present disclosure is applied to a system including a terminal device and a network device. In some cases, the terminal device and the network device according to an embodiment of the present disclosure include, but are not limited to, 5G devices. The network device may be a 5G core network device. A network device of a network operator generates a first public key for data encryption and a first private key for data decryption. The first private key is stored in the network device, and the first public key is assigned to the terminal device. The network operator assigns privacy information (i.e., an IMSI) and the first public key (the public key generated by the network operator) to the terminal device during an initial subscription and establishment of an account of a user. The terminal device further generates a locally stored second public key and a second private key. The IMSI and the first public key of the terminal device are stored in a Universal Subscriber Identity Module (USIM) card of the terminal device.

Figure 5:
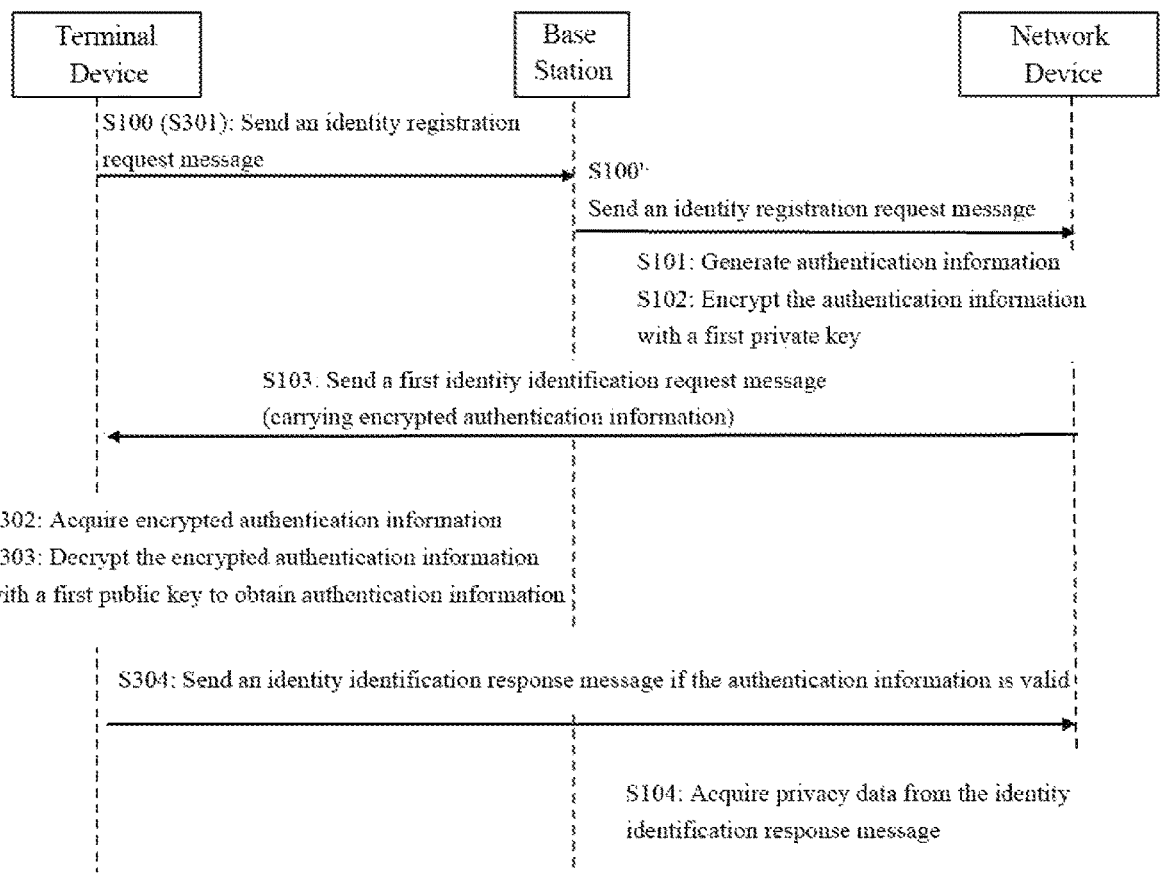
FIG. 5 depicts a flowchart showing signaling of a privacy information transmission method according to an embodiment of the present disclosure.

According to an embodiment of the present disclosure, a privacy information transmission method is provided. The method is performed by a network device. Referring to FIG. 1 and FIG. 5, the privacy information transmission method includes the following S101 to S104.

At S101, authentication information is generated when an identity registration request message is received.

Prior to this operation, a terminal device sends an identity registration request message to a base station upon initial access to a network or a restart after a long time of shutdown of the terminal device (S100 in FIG. 5). The identity registration request message carries a globally unique temporary identity (GUTI) of the terminal device. The base station forwards the identity registration request message to a network device in a core network (S100' in FIG. 5).

The network device of the core network has no information about the real identity of the terminal device through the GUTI, due to initial access to a network or a restart after a long time of shutdown of the terminal device. In order to verify the real identity of the terminal device, the network device generates authentication information.

At S102, the authentication information is encrypted with a first private key.

In this operation, the network device encrypts the authentication information with a pre-stored first private key to generate encrypted authentication information.

At S103, a first identity identification request message is sent to the terminal device.

In this operation, the network device sends the first identity identification request message carrying the encrypted authentication information to the terminal device. After receiving the encrypted authentication information, the terminal device performs decryption with a pre-stored first public key and verifies whether the authentication information is valid.

At S104, an identity identification response message returned by the terminal device is received, and privacy information in the identity identification response message is acquired.

In this operation, when decrypting the encrypted authentication information carried in the first identity identification request message and determining that the authentication information is valid, the terminal device returns an identity identification response message carrying privacy information to the network device. The network device acquires the privacy information in the identity identification response message. When determining that the privacy information is correct, the network device determines that the identity of the terminal device is authentic, and allows the terminal device to access the network. It is to be noted that the privacy information herein may include encrypted privacy data or unencrypted privacy data.

According to an embodiment of the present disclosure, the network device generates and encrypts authentication information, so that the terminal device can authenticate the authentication information to prevent a fake base station from acquiring the privacy information of the terminal device, ensuring that initial NAS signaling of the terminal device and the network device can transmit the privacy information safely during initial access to a network or a restart after a long time of shutdown of the terminal device, preventing the leakage of the privacy information, and improving the security and reliability of data transmission.

In some embodiments, the privacy information includes unencrypted privacy data. When decrypting the encrypted authentication information carried in the first identity identification request message and determining that the authentication information is valid, the terminal device returns an identity identification response message carrying the unencrypted privacy data to the network device. The network device acquires the unencrypted privacy data in the identity identification response message. When determining that the unencrypted privacy data is correct, the network device determines that the identity of the terminal device is authentic, and allows the terminal device to access the network.

Figure 7A:
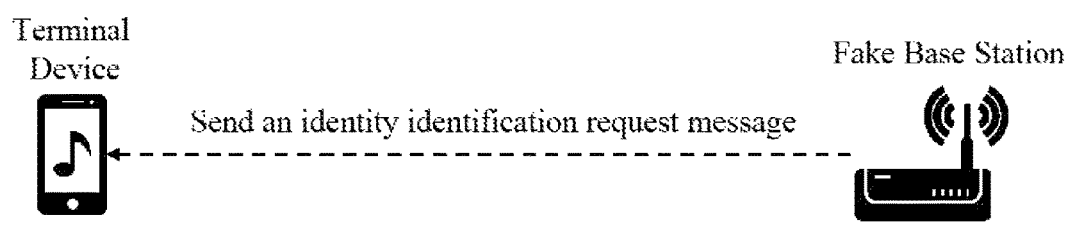
FIG. 7a and FIG. 7b depict schematic diagrams of operations for preventing privacy information from being stolen by attackers according to an embodiment of the present disclosure.

In some cases, as shown in FIG. 7a, an attacker may actively capture the privacy information during initial access to a network or a restart after a long time of shutdown of the terminal device. In particular, the attacker, for example, uses a fake base station device to simulate a real base station to send an identity identification request message to the terminal device, so as to acquire a user's privacy information. Since the fake base station cannot simulate the network device of the real core network to deliver the authentication information encrypted with the first private key, the terminal device cannot obtain the authentication information when performing decryption with the first public key, or the obtained authentication information is invalid. Therefore, the terminal device will neither respond to the identity identification request message sent by the pseudo base station, nor leak the user's privacy information to the pseudo base station.

Figure 2:
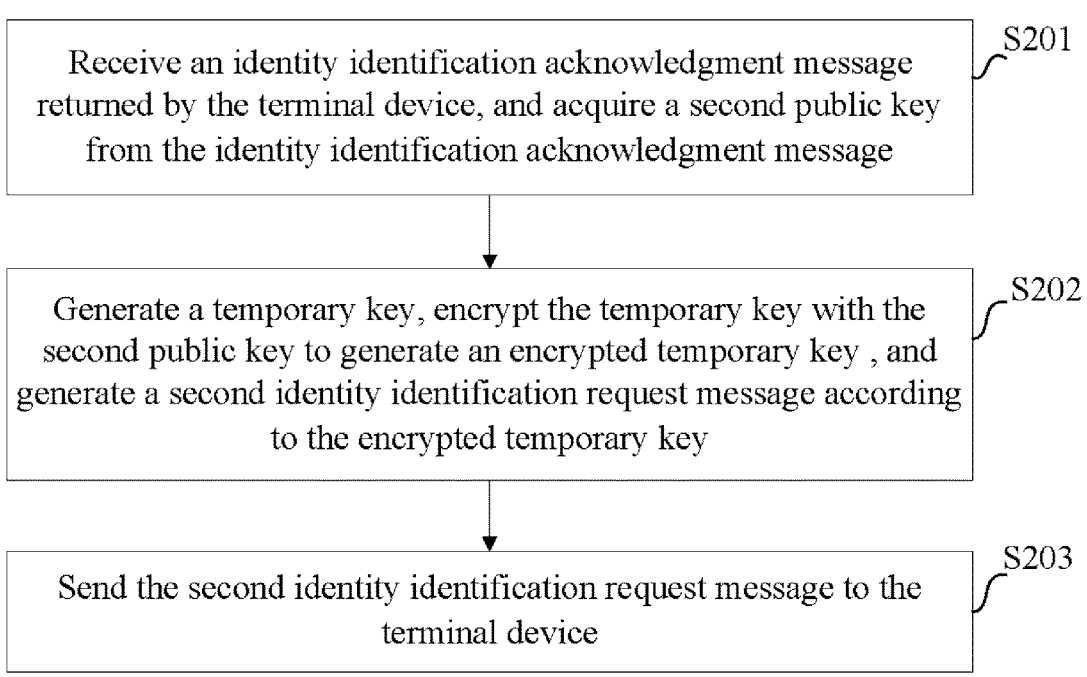
FIG. 2 depicts a flowchart of a privacy information transmission method according to another embodiment of the present disclosure.
Figure 6:
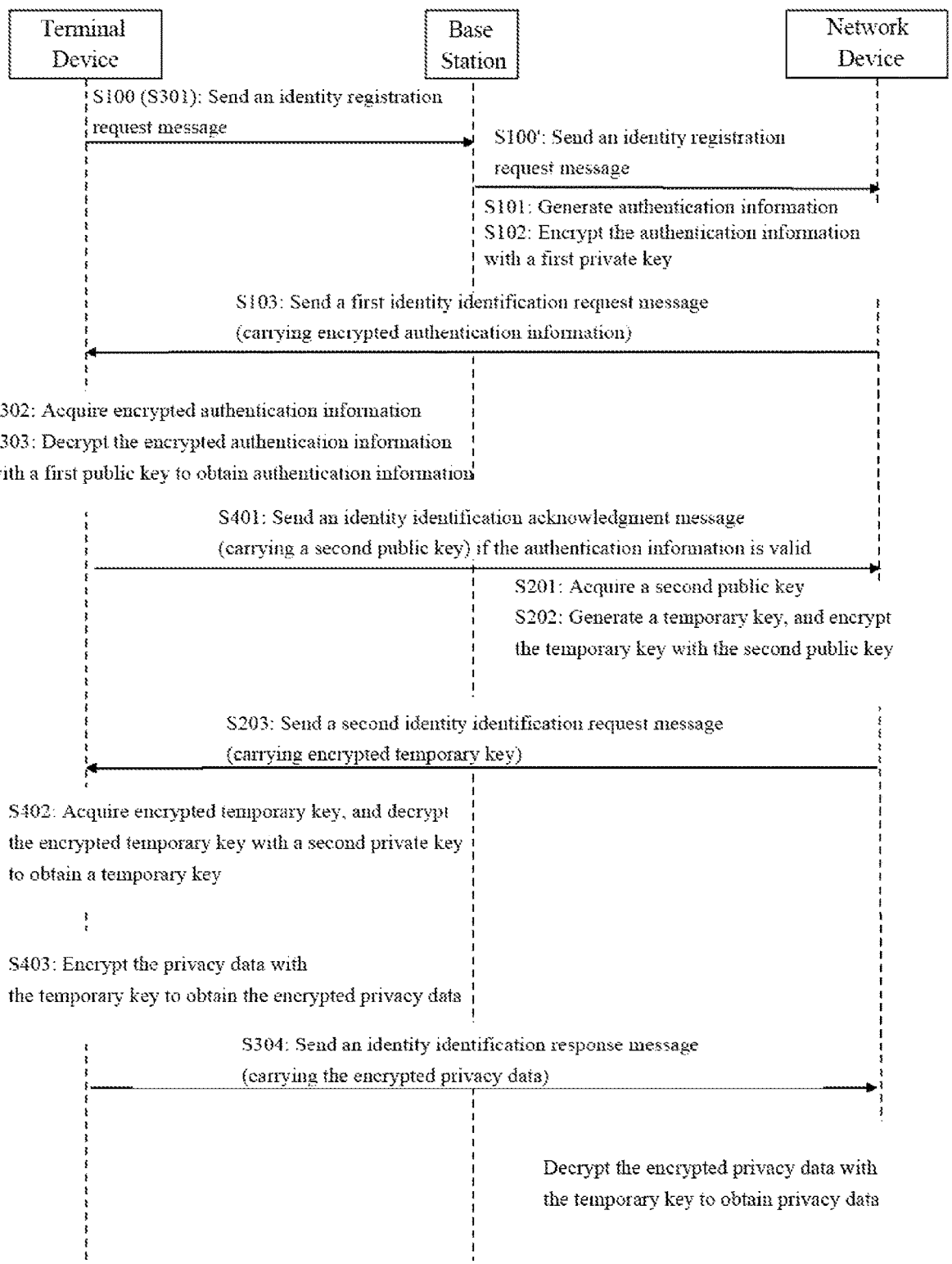
FIG. 6 depicts a flowchart showing signaling of a privacy information transmission method according to another embodiment of the present disclosure.

During initial access to a network or a restart after a long time of shutdown of the terminal device, the attacker may also passively capture the privacy information of the initial NAS signaling. "Passively" means that the attacker acquires privacy information by monitoring signaling messages between the terminal device and the network and parsing data. For such privacy information interception described above, in some embodiments, referring to FIG. 2 and FIG. 6, the privacy information includes encrypted privacy data, and after the sending a first identity identification request message to the terminal device (i.e., S103), the method further includes the following S201 to S203.

At S201, an identity identification acknowledgment message is received from the terminal device, and a second public key is acquired from the identity identification acknowledgment message.

When decrypting the encrypted authentication information carried in the first identity identification request message and determining that the authentication information is valid, the terminal device sends the identity identification acknowledgment message carrying the second public key to the network device. In this operation, the network device receives the identity identification acknowledgment message and acquires the second public key from the identity identification acknowledgment message.

At S202, a temporary key is generated, and is encrypted with the second public key, and a second identity identification request message is generated according to the encrypted temporary key.

In this operation, the network device generates the temporary key, encrypts the temporary key with the second public key, and generates the second identity identification request message carrying the encrypted temporary key.

At S203, a second identity identification request message is sent to the terminal device.

In this operation, the network device sends the second identity identification request message to the terminal device, so that the terminal device acquires the temporary key and performs encryption with the temporary key.

Correspondingly, the acquiring of privacy information in the identity identification response message (i.e., S104) includes: acquiring the encrypted privacy data carried in the identity identification response message. The method further includes: decrypting the encrypted privacy data with the temporary key to obtain privacy data following S104. When determining that the decrypted privacy data is correct, the network device determines that the identity of the terminal device is authentic and allows the terminal device to access the network.

Figure 7B:
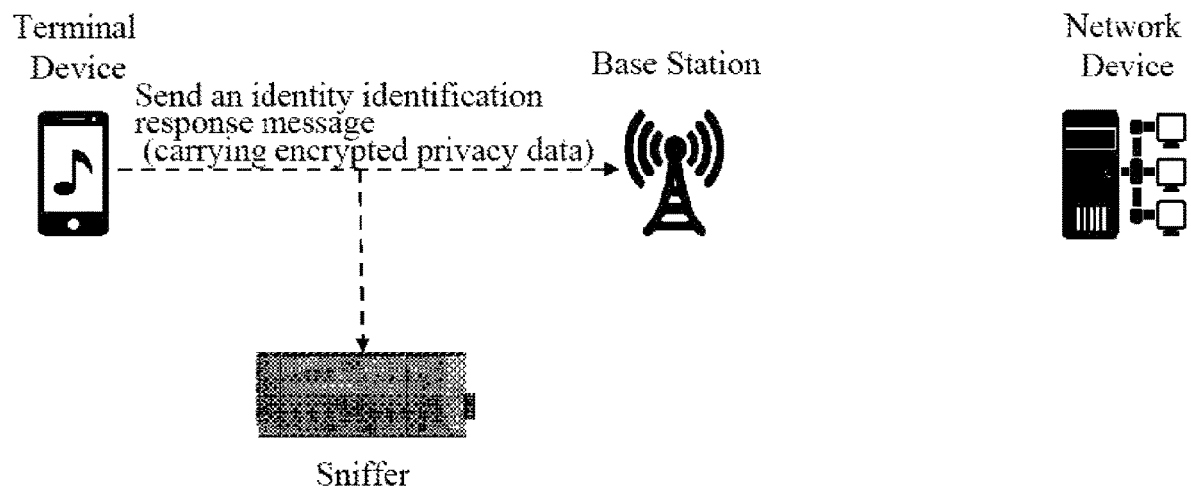

In some cases, as shown in FIG. 7b, an attacker may passively capture the privacy information during initial access to a network or a restart after a long time of shutdown of the terminal device. In particular, the attacker, for example, uses a sniffer to monitor an air-interface wireless signal of the identity identification response message sent by the terminal device and perform wireless communication protocol analysis to capture the privacy information. In the embodiment of the present disclosure, since the terminal device encrypts all privacy data carried in privacy information with the temporary key, the attacker cannot obtain plain text contents of the privacy data. Moreover, because the temporary key is changed every time privacy information is transmitted, the ciphertext of privacy data transmitted each time is different, and consequently, the attacker cannot bind the ciphertext of the privacy data with the user for tracking.

In some embodiments, the authentication information is a timestamp, so the encrypted authentication information is an encrypted timestamp.

Figure 3:
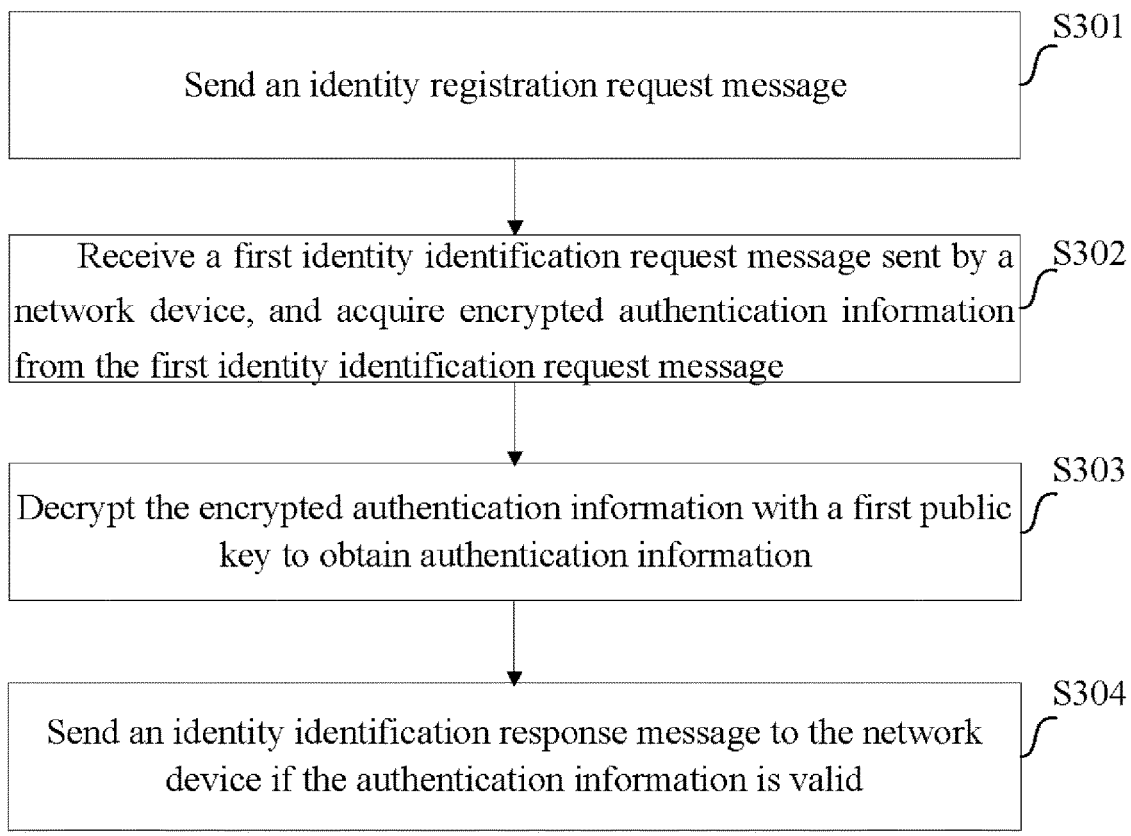
FIG. 3 depicts a flowchart of a privacy information transmission method according to yet another embodiment of the present disclosure.

According to an embodiment of the present disclosure, a privacy information transmission method is further provided to prevent an attacker from actively capturing the privacy information of the initial NAS signaling with a fake base station during initial access to a network or a restart after a long time of shutdown of the terminal device. The method is performed by a terminal device. Referring to FIG. 3 and FIG. 5, the privacy information transmission method includes the following S301 to S304.

At S301, an identity registration request message is sent.

In this operation, upon initial access to a network or a restart after a long time of shutdown of the terminal device, the terminal device sends an identity registration request message carrying a GUTI to a base station (i.e., S100 in FIG. 5). Following this operation, the base station forwards the identity registration request message to a network device in a core network (i.e., S100' in FIG. 5).

At S302, a first identity identification request message sent by a network device is received, and encrypted authentication information is acquired from the first identity identification request message.

After receiving the identity registration request message forwarded by the base station, the network device generates authentication information, encrypts the authentication information with a locally stored first public key to generate encrypted authentication information, and sends a first identity identification request message carrying the encrypted authentication information to the terminal device. The terminal device acquires the encrypted authentication information from the first identity identification request message.

At S303, the encrypted authentication information is decrypted with a first public key to obtain authentication information.

In this operation, the terminal device decrypts the encrypted authentication information with a pre-stored first public key to obtain authentication information.

At S304, an identity identification response message is sent to the network device if the authentication information is valid.

If the terminal device determines that the authentication information is valid, indicating that the first identity identification request message is sent by an authentic network device, an identity identification response message carrying privacy information is sent to the network device, so that the network device acquires the privacy information in the identity identification response message. If the network device can determine that the privacy information is correct, then it is considered that the identity of the terminal device is authentic, and the terminal device is allowed to access the network. It is to be noted that the privacy information herein may be encrypted privacy data or unencrypted privacy data.

According to an embodiment of the present disclosure, the network device generates and encrypts authentication information, so that the terminal device can authenticate the authentication information to prevent a fake base station from acquiring the privacy information of the terminal device, ensuring that initial NAS signaling of the terminal device and the network device can transmit the privacy information safely during initial access to a network or a restart after a long time of shutdown of the terminal device, preventing the leakage of the privacy information, and improving the security and reliability of data transmission.

In some embodiments, the privacy information includes unencrypted privacy data. The terminal device sends an identity identification response message carrying the unencrypted privacy data to the network device, so that the terminal device acquires the unencrypted privacy data. When determining that the privacy data is correct, the network device determines that the identity of the terminal device is authentic, and allows the terminal device to access the network.

In some cases, as shown in FIG. 7a, an attacker may actively capture the privacy information during initial access to a network or a restart after a long time of shutdown of the terminal device. In particular, the attacker, for example, uses a fake base station device to simulate authentic base station to send an identity identification request message to the terminal device, so as to acquire a user's privacy information. Since the fake base station cannot simulate the network device of the authentic core network to deliver the authentication information encrypted with the first private key, the terminal device cannot obtain the authentication information when performing decryption with the first public key, or the obtained authentication information is invalid. Therefore, the terminal device will neither respond to the identity identification request message sent by the fake base station, nor leak the user's privacy information to the fake base station.

Figure 4:
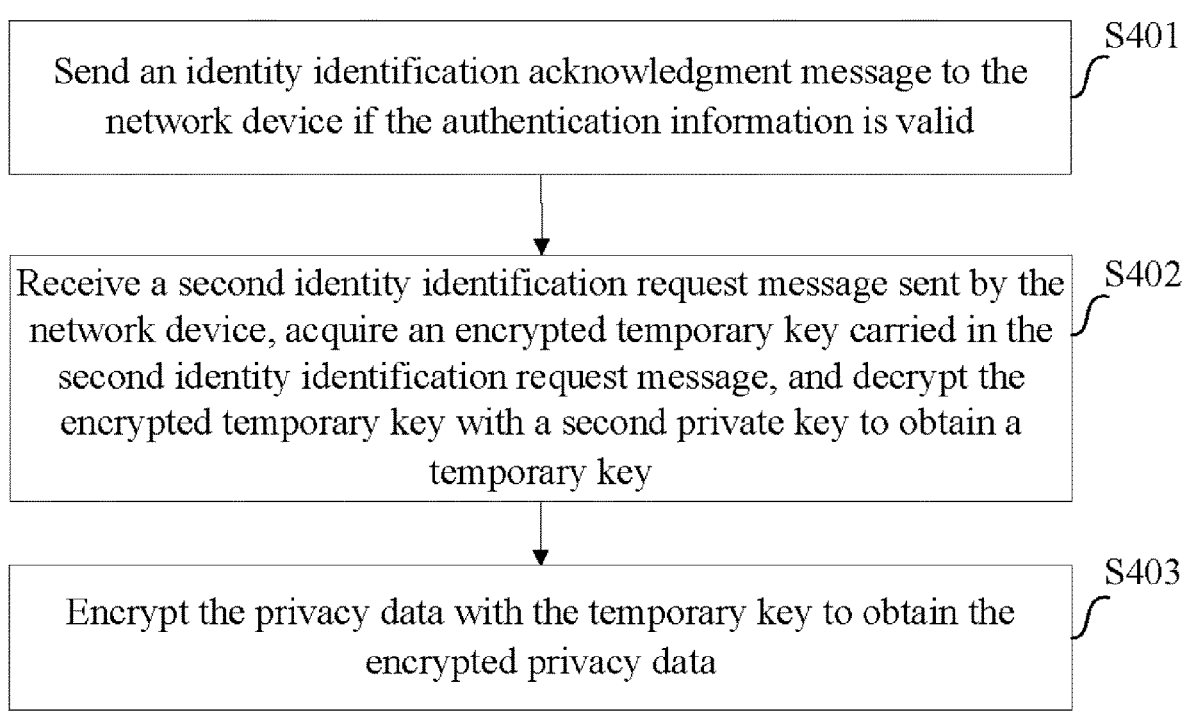
FIG. 4 depicts a flowchart of a privacy information transmission method according to yet another embodiment of the present disclosure.

In some cases, an attacker may use a sniffer to passively capture the privacy information of the initial NAS signaling during initial access to a network or a restart after a long time of shutdown of the terminal device. In view of this, referring to FIG. 4 and FIG. 6, in some embodiments the privacy information includes encrypted privacy data, and before the sending of an identity identification response message to the network device (i.e., 6304), the method further includes the following S401 to S403.

At S401, an identity identification acknowledgment message is sent to the network device if the authentication information is valid.

In this operation, when decrypting the encrypted authentication information carried in the first identity identification request message and determining that the authentication information is valid, the terminal device returns an identity identification acknowledgment message carrying a second public key to the network device.

At S402, a second identity identification request message sent by the network device is received, an encrypted temporary key carried in the second identity identification request message is acquired, and the encrypted temporary key is decrypted with a second private key to obtain a temporary key.

In this operation, the encrypted temporary key is obtained by encryption of the temporary key generated by the network device with the second public key. The terminal device decrypts the encrypted temporary key according to a locally stored second private key to obtain the temporary key.

At S403, the privacy data is encrypted with the temporary key to obtain the encrypted privacy data.

In this operation, the terminal device encrypts the privacy data with the temporary key to obtain the encrypted privacy data, i.e., an encrypted IMSI.

Correspondingly, the sending of an identity identification response message to the network device (i.e., S304) includes: sending the identity identification response message carrying the encrypted privacy data to the network device.

In this operation, the terminal device sends an identity identification response message carrying the encrypted privacy data to the network device, so that the network device can perform decryption with the temporary key to acquire privacy data. If the network device determines that the decrypted privacy data is correct, then it is considered that the identity of the terminal device is authentic, and the terminal device is allowed to access the network.

In some cases, as shown in FIG. 7b, an attacker may passively capture the privacy information during initial access to a network or a restart after a long time of shutdown of the terminal device. In particular, the attacker, for example, uses a sniffer to monitor an air-interface wireless signal sent by the terminal device and perform wireless communication protocol analysis to capture the privacy information. According to an embodiment of the present disclosure, since the terminal device encrypts all privacy data carried in privacy information with the temporary key, the attacker cannot obtain plain text contents of the privacy data. Moreover, since the temporary key is changed every time privacy information is transmitted, the ciphertext of privacy data transmitted each time is different, and consequently, the attacker cannot bind the ciphertext of the privacy data with the user for tracking.

In some embodiments, the validity of the authentication information includes: the timestamp being consistent with the current time. If it is verified that the timestamp is consistent with the current time, then it indicates that the authentication information is valid. Otherwise, if the timestamp cannot be decrypted or the decrypted timestamp is inconsistent with the current time, then it indicates that the authentication information is invalid.

Figure 8:
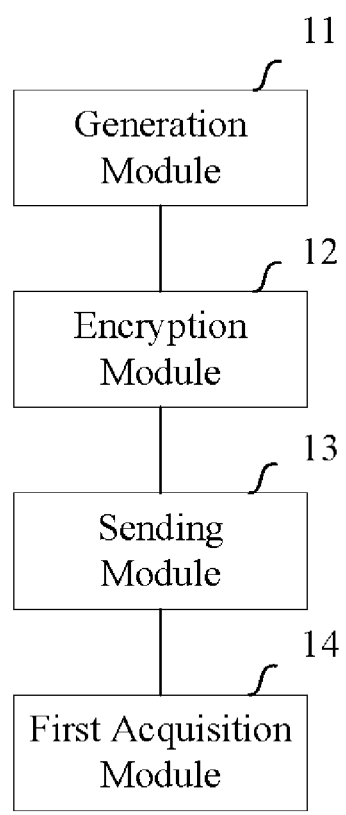
FIG. 8 depicts a schematic diagram of a network device according to an embodiment of the present disclosure.

Based on the same technical concept as the foregoing embodiments, as shown in FIG. 8, according to an embodiment of the present disclosure, a network device is further provided, which includes: a generation module 11, an encryption module 12, a sending module 13 and an acquisition module 14.

The generation module 11 is configured to generate authentication information when an identity registration request message is received from a terminal device via a base station.

The encryption module 12 is configured to encrypt the authentication information with a first private key.

The sending module 13 is configured to send a first identity identification request message carrying the encrypted authentication information to the terminal device.

The acquisition module 14 is configured to receive an identity identification response message returned by the terminal device, and acquire privacy information from the identity identification response message.

In some embodiments, the network device further includes: a second acquisition module configured to receive an identity identification acknowledgment message returned by the terminal device and to acquire a second public key from the identity identification acknowledgment message, and an encryption module configured to generate a temporary key, and to encrypt the temporary key with the second public key.

The sending module 13 is further configured to generate a second identity identification request message according to the encrypted temporary key, and send the second identity identification request message to the terminal device.

The first acquisition module 14 is further configured to acquire the encrypted privacy data carried from the identity identification response message, and decrypt the encrypted privacy data with the temporary key to obtain privacy data.

In some embodiments, the privacy information includes unencrypted privacy data. In some embodiments, the authentication information includes a timestamp.

Figure 9:
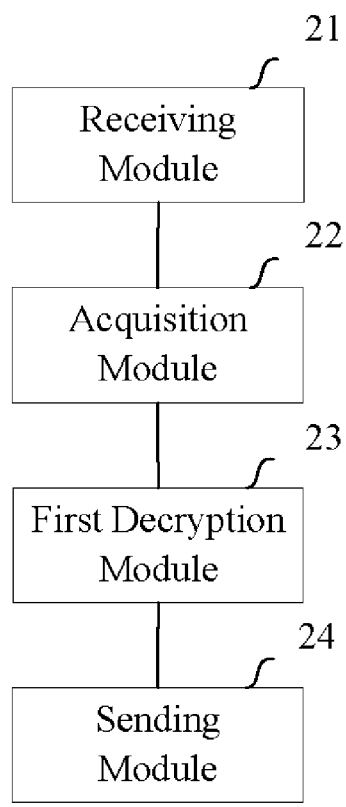
FIG. 9 depicts a schematic diagram of a terminal device according to an embodiment of the present disclosure.

Based on the same technical concept as the foregoing embodiments, as shown in FIG. 9, according to an embodiment of the present disclosure, a terminal device is further provided, which includes: a receiving module 21, an acquisition module 22, a first decryption module 23 and a sending module 24.

The receiving module 21 is configured to receive a first identity identification sent by a network device.

The acquisition module 22 is configured to acquire encrypted authentication information from the first identity identification request message.

The first decryption module 23 is configured to decrypt the encrypted authentication information with a first public key to obtain authentication information.

The sending module 24 is configured to send an identity registration request message; and send an identity identification response message carrying privacy information to the network device if the authentication information is valid.

In some embodiments, the privacy information includes encrypted privacy data, and the terminal device further includes: the sending module, a second decryption module, an encryption module and the sending module 24.

The sending module is further configured to send an identity identification acknowledgment message carrying a second public key to the network device.

The second decryption module is configured to receive a second identity identification request message sent by the network device, acquire encrypted temporary key carried in the second identity identification request message, and decrypt the encrypted temporary key with a second private key to obtain a temporary key, the encrypted temporary key is obtained by encryption of the temporary key generated by the network device with the second public key.

The encryption module is configured to encrypt the privacy data with the temporary key to obtain the encrypted privacy data.

The sending module 24 is further configured to send the identity identification response message carrying the encrypted privacy data to the network device.

In some embodiments, the privacy information includes unencrypted privacy data.

In some embodiments, the authentication information includes a timestamp, and the validity of the authentication information includes: the timestamp being consistent with the current time.

Figure 10:
FIG. 10 depicts a schematic diagram of a computer device according to an embodiment of the present disclosure.

Referring to FIG. 10, according to an embodiment of the present disclosure, a computer device is further provided. The computer device includes: one or more processors 1001 and a storage apparatus 1002. The storage apparatus 1002 stores one or more programs. The one or more programs, when executed by the one or more processors 1001, cause the one or more processors 1001 to implement the privacy information transmission method as described in the above embodiments.

According to an embodiment of the present disclosure, further provided is a non-transitory computer-readable medium storing a computer program which, when executed by a processor, causes the processor to perform the privacy information transmission method as described in the above embodiments.

Based on the privacy information transmission method, the apparatus, the computer device and the non-transitory computer-readable medium according to the embodiments of the present disclosure, authentication information is generated when an identity registration request message is received, and the authentication information is encrypted with a first private key; a first identity identification request message carrying the encrypted authentication information is sent to the terminal device; and an identity identification response message returned by the terminal device is received, and privacy information is acquired from the identity identification response message. According to an embodiment of the present disclosure, the network device generates and encrypts authentication information, so that the terminal device can authenticate the authentication information to prevent a fake base station from acquiring the privacy information of the terminal device, ensuring that initial NAS signaling of the terminal device and the network device can transmit the privacy information safely during initial access to a network or a restart after a long time of shutdown of the terminal device, preventing the leakage of the privacy information, and improving the security and reliability of data transmission.

Those having ordinary skill in the art may understand that all or some of the steps in the method and the functional modules/units in the apparatus disclosed above may be implemented as software, firmware, hardware and appropriate combinations thereof. In a hardware implementation, the division between the functional modules/units mentioned in the above description does not necessarily correspond to the division of physical components. For example, one physical component may have multiple functions, or one function or step may be jointly performed by several physical components. Some or all of the physical components may be implemented as software executed by a processor such as a central processing unit, a digital signal processor or a microprocessor, or may be implemented as hardware or an integrated circuit such as an application-specific integrated circuit. Such software may be distributed on a non-transitory computer-readable medium, which may include a computer storage medium (or non-transitory medium) and a communication medium (or a transitory medium). As is well known to those having ordinary skill in the art, the term "computer storage medium" includes volatile and nonvolatile, removable and non-removable media implemented in any method or technology for storing information (such as computer-readable instructions, data structures, program modules, or other data). The computer storage medium includes, but is not limited to, a random access memory (RAM), a read-only memory (ROM), an electrically erasable programmable read-only memory (EEPROM), a flash memory or other memory technologies, a compact disc read-only memory (CD-ROM), a digital versatile disk (DVD) or other optical storage, magnetic cassette, magnetic tape, magnetic disk storage or other magnetic storage apparatuses, or any other media that can be configured for storing desired information and can be accessed by a computer. Furthermore, as is well known to those having ordinary skill in the art, the communication medium typically includes computer-readable instructions, data structures, program modules or other data in a modulated data signal such as a carrier wave or other transport mechanisms, and may include any information delivery medium.

Some embodiments have been disclosed herein, and specific terms are employed. However, they are employed and should be interpreted in a generic and descriptive sense only and not for purposes of limitation. In some examples, features, characteristics and/or elements described in connection with a particular embodiment may be used alone or in combination with features, characteristics and/or elements described in connection with other embodiments, unless expressly stated otherwise, as would be apparent to those having ordinary skill in the art. Therefore, it will be understood by those having ordinary skill in the art that various changes in forms and details may be made without departing from the scope of the present disclosure as set forth in the appended claims.

The invention claimed is:

1. A privacy information transmission method, which is performed by a network device, the method comprising:
   generating authentication information in response to receiving of an identity registration request message sent by a terminal device via a base station, the identity registration request message carrying a globally unique temporary identity, GUTI, of the terminal device, and encrypting the authentication information with a first private key to generate encrypted authentication information;
   sending a first identity identification request message carrying the encrypted authentication information to the terminal device;
   receiving an identity identification response message returned by the terminal device in response to the authentication information being determined as valid by the terminal device, and acquiring privacy information from the identity identification response message; wherein the authentication information comprises a timestamp, and the authentication information being determined as valid comprises: the timestamp being determined as consistent with the current time;
   and determining by the network device that the identity of the terminal device is authentic if privacy data is correct;
   wherein the privacy information comprises encrypted privacy data, and subsequent to the sending of the first identity identification request message to the terminal device, the method further comprises:
   receiving an identity identification acknowledgment message returned by the terminal device, and acquiring a second public key from the identity identification acknowledgment message; and
   generating a temporary key, encrypting the temporary key with the second public key to generate an encrypted temporary key, generating a second identity identification request message according to the encrypted temporary key, and sending the second identity identification request message to the terminal device;
   the acquiring of privacy information from the identity identification response message comprises: acquiring the encrypted privacy data carried in the identity identification response message; and
   subsequent to the acquiring of privacy information from the identity identification response message, the method further comprises: decrypting the encrypted privacy data with the temporary key to generate privacy data.

2. A privacy information transmission method, which is performed by a terminal device, the method comprising:
   sending an identity registration request message carrying a globally unique temporary identity, GUTI, of the terminal device;
   receiving a first identity identification request message sent by a network device, and acquiring encrypted authentication information from the first identity identification request message; wherein, the authentication information is encrypted with a first private key, by the network device;
   decrypting the encrypted authentication information with a first public key to generate authentication information; and
   sending an identity identification response message carrying privacy information to the network device in response to the authentication information being determined as valid by the terminal device; wherein the authentication information comprises a timestamp, and the authentication information being determined as valid comprises: the timestamp being determined as consistent with the current time;
   wherein the privacy information comprises encrypted privacy data, and prior to the sending of the identity identification response message to the network device, the method further comprises:

sending an identity identification acknowledgment message carrying a second public key to the network device;

receiving a second identity identification request message sent by the network device, acquiring an encrypted temporary key carried in the second identity identification request message, and decrypting the encrypted temporary key with a second private key to generate a temporary key, the encrypted temporary key being generated by encryption of the temporary key generated by the network device with the second public key; and encrypting the privacy data with the temporary key to generate the encrypted privacy data; and the sending of an identity identification response message to the network device comprises: sending the identity identification response message carrying the encrypted privacy data to the network device.

3. A non-transitory computer-readable medium, storing a computer program which, when executed by a processor, causes the processor to perform the method as claimed in claim 2.

4. A non-transitory computer-readable medium, storing a computer program which, when executed by a processor, causes the processor to perform a privacy information transmission method comprising, generating authentication information in response to receiving of an identity registration request message sent by a terminal device via a base station, the identity registration request message carrying a globally unique temporary identity, GUTI, of the terminal device, and encrypting the authentication information with a first private key to generate encrypted authentication information;

sending a first identity identification request message carrying the encrypted authentication information to the terminal device; and receiving an identity identification response message returned by the terminal device in response to the authentication information being determined as valid by the terminal device, and acquiring privacy information from the identity identification response message;

wherein the authentication information comprises a timestamp, and the authentication information being determined as valid comprises: the timestamp being determined as consistent with the current time;

and determining by the network device that the identity of the terminal device is authentic if privacy data is correct;

wherein the privacy information comprises encrypted privacy data, and subsequent to the sending of the first identity identification request message to the terminal device, the method further comprises:

receiving an identity identification acknowledgment message returned by the terminal device, and acquiring a second public key from the identity identification acknowledgment message; and generating a temporary key, encrypting the temporary key with the second public key to generate an encrypted temporary key, generating a second identity identification request message according to the encrypted temporary key, and sending the second identity identification request message to the terminal device;

the acquiring of privacy information from the identity identification response message comprises: acquiring the encrypted privacy data carried in the identity identification response message; and subsequent to the acquiring of privacy information from the identity identification response message, the method further comprises: decrypting the encrypted privacy data with the temporary key to generate privacy data.

* * * * *